United States Patent [19]
Gerlach

[11] 3,945,671
[45] Mar. 23, 1976

[54] SEAL LOCK AND THE LIKE INCORPORATING PERMANENTLY SECURED SINGLE ENGAGEMENT

[75] Inventor: John R. Gerlach, Monterey Park, Calif.

[73] Assignee: Emhart Corporation, Farmington, Conn.

[22] Filed: Oct. 23, 1974

[21] Appl. No.: 517,363

[52] U.S. Cl. .............................. 292/323; 292/327
[51] Int. Cl.² ......................................... E05C 19/18
[58] Field of Search ............ 403/327, 328; 292/327, 292/323, 252

[56] References Cited
UNITED STATES PATENTS

| | | | |
|---|---|---|---|
| 409,034 | 8/1889 | Gillespie | 292/327 |
| 1,332,291 | 3/1920 | Goodell | 292/327 |
| 1,618,851 | 2/1927 | Thunberg et al. | 292/252 X |
| 1,916,412 | 7/1933 | Buchanan | 403/327 X |
| 1,930,560 | 10/1933 | Keidel | 292/318 |
| 3,698,748 | 10/1972 | Petri | 403/328 |
| 3,810,703 | 5/1974 | Pasbrig | 403/328 |

*Primary Examiner*—Richard E. Moore
*Attorney, Agent, or Firm*—Mahoney, Schick & Cislo

[57] ABSTRACT

A preferably cylindrical body has a closed bottom bolt opening with an internal spring pressed plunger constantly urged at an angle less than 90° to the bolt opening into interference partially within the bolt opening and retained against such movement by a selectively movable plug within the bolt opening. A bolt preferably having an enlarged head has a recess at an opposite end portion formed generally transversely therein. The bolt end portion is inserted into the body bolt opening displacing the plug further inwardly into the bolt opening and ultimately aligning the bolt end portion recess with the body plunger causing positive interengagement therebetween and permanently preventing withdrawal of the bolt from the body. An annular shoulder of the bolt may engage a body surface at the outer end of the bolt opening during such interengagement to permanently block off the body bolt opening.

4 Claims, 3 Drawing Figures

U.S. Patent   March 23, 1976   3,945,671
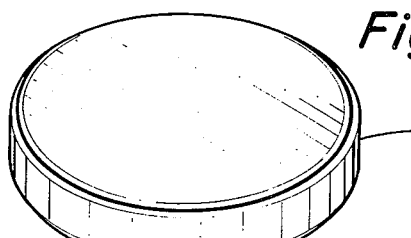
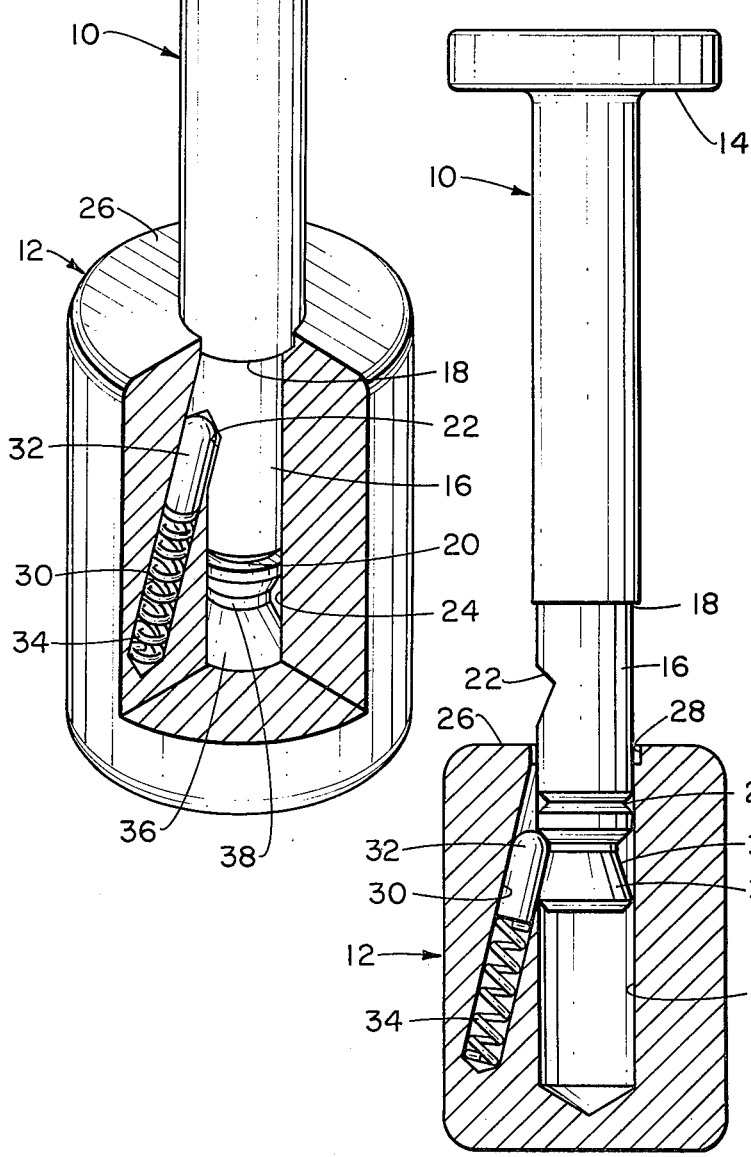
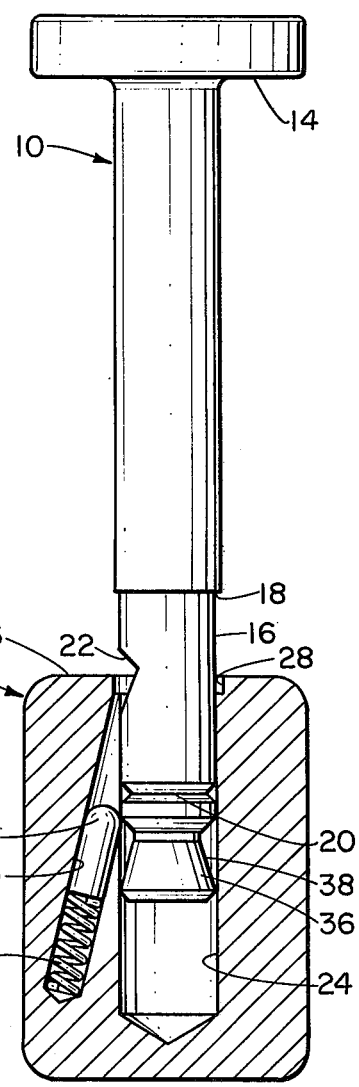

SEAL LOCK AND THE LIKE INCORPORATING PERMANENTLY SECURED SINGLE ENGAGEMENT

BACKGROUND OF THE INVENTION

This invention relates to a seal lock and the like of the type incorporating a permanently secured single engagement, that is, when a bolt is inserted in a body, interengagement takes place therebetween and positively prevents removal of the bolt from the body without virtually complete destruction. According to certain of the principles of the present invention, the body includes a resiliently urged securement member mounted therein constantly urged into interference projecting partially into a bolt opening and retained in assembly prior to bolt insertion by a selectively movable plug within the bolt opening. A bolt end portion has a recess formed therein and when the bolt end portion is inserted into the body bolt opening, the plug is displaced inwardly of the body bolt opening permitting the body securement member to engage the bolt end portion and ultimately lodge in the bolt end portion recess permanently interengaging therein and positively preventing separation of the bolt and body. Various adjuncts may be incorporated into the structure for minimizing material requirements while preserving positive functioning and for eliminating the danger of possible tampering.

Various forms of seals have been previously used in years past at the access openings of shipping containers, for instance, at the access doors of trucks and railroad cars, and in many cases, in smaller sized shipping containers where the surreptitious removal of a portion of the contents thereof can present a problem. The prior seals have been of quite simple form and frequently have only consisted of a metal tape with a single enegement securement member, that is, a securement member of the type wherein, when the metal tape is engaged therewith, it is impossible to remove the same without a destruction of the tape or securement member. The prime purpose of these simple forms of seals as used on shipping containers has not been to secure the container against such unauthorized access, but has merely been for the purpose of indicating to the ultimate container recipient that such unauthorized access has been made.

In more recent times, the frequency of shipping container contents pilfering has become considerably more frequent. This has resulted in a new generation of various forms of seals which have rightfully been termed seal locks. As is denoted by the terminology used, these seal locks perform the prior function of the plain seals to denote that access to the contents of a shipping container has been obtained, and also to provide a reasonable degree of security in an effort to frustrate such violations, or at least delay or make more obvious the violation attempts so that the unauthorized persons involved and their attempts might be detected.

These seal locks approach and, in many cases, exceed the security of conventional key-type or combination-type locks, yet are of the single engagement, permanently secured form. Once these seal locks are engaged, it is intended that they cannot again be disengaged without virtual destruction of major portions thereof. Thus, in view of their single use, these seal locks must be of a relatively simple operating, permanently securing nature to minimize the cost thereof, while still being of a relatively high degree of security approaching, if not exceeding, the security of conventional key-type and combination-type locks.

OBJECTS AND SUMMARY OF THE INVENTION

It is, therefore, an object of this invention to provide a seal lock and the like incorporating permanently secured single engagement which may be constructed of a relatively high security nature approaching, if not exceeding, the security of conventional key-type and combination-type locks. The permanently securing, single engaging locking mechanism of the seal lock of the present invention is quite positive in actuation and results in a permanently secured lock assembly which is virtually impossible to violate, thereby requiring a very apparent destruction of a major element of the lock in order to remove the same from members retained thereby. Furthermore, the degree of security attained with the seal lock of the present invention may be selectively varied to meet various requirements encountered through the proper selection of the various materials making up the same, higher strength materials to meet higher security standards and lesser strength materials to meet lesser security standards.

It is a further object of this invention to provide a seal lock and the like of the foregoing general nature which, due to its unique structure, may be provided at relatively low cost and particularly markedly less than key-type or combination-type locks of comparable security. In a typical application of the principles of the present invention as provided in a preferred embodiment thereof, a headed bolt has a free bolt end portion engagable in a lock body for assembled securement. A securement member within the lock body is constantly urged into interference with a bolt opening and prior to the bolt end portion insertion, the securement member is retained ready for final engagement by a selectively movable blocking member. As the bolt end portion is inserted into the lock body, it engages the blocking member and forces it further inwardly of the bolt opening ultimately bringing the securement member into engagement with the bolt end portion where cooperating surfaces therebetween interengage and permanently secure the bolt end portion assembled with the lock body.

It is still a further object of this invention to provide a seal lock and the like which may be fabricated with relatively high security features and relatively inexpensively due to the unique permanent securement mechanism thereof, yet which, in certain forms thereof, may be particularly constructed for even further fabrication cost reductions. In the preferred embodiment form hereinbefore set forth, the constantly urged securement member may be mounted movable into interengagement with the bolt end portion at virtually any angle relative to the axis of the bolt opening of the lock body, since it is only necessary to provide the proper shape of interengaging surfaces necessary for the resultant permanent interengagement. This means that the outer dimensions of the lock body need not be determined by the particular mounting of the securement member within the lock body. The size of lock body may, therefore, be greatly reduced so as to minimize material requirements and even further reduce the overall cost of the seal lock assembly.

Other objects and advantages of the invention will be apparent from the following specification and the accompanying drawings which are for the purpose of

BRIEF DESCRIPTION OF THE DRAWING

FIG. 1 is a top-front perspective view of a preferred embodiment of the seal lock of the present invention, a portion thereof being cut away and in section to expose internal elements and the seal lock being shown in permanently secured assembled position;

FIG. 2 is a side elevational view, part in section, showing the elements of the seal lock of FIG. 1 just beginning the assembly operation; and FIG. 3 is a view similar to FIG. 2 showing the seal lock elements intermediate the assembly operation.

DESCRIPTION OF THE BEST EMBODIMENT CONTEMPLATED

Referring to the drawing, a preferred embodiment of the seal lock of the present invention includes a generally cylindrical bolt generally indicated at 10 and a generally cylindrical lock body generally indicated at 12. The bolt 10 is a headed bolt having an enlarged head 14 at one end thereof and terminating axially oppositely in an end portion 16 of spaced less diameter so as to form an annular radial shoulder 18 between the end portion and the larger diameter remaining portion of the bolt. The bolt end portion 16 has an end surface 20 preferably at right angles to the axial extension of the bolt 10 and an engagement recess 22 positioned axially intermediate thereof axially spaced from the shoulder 18 a particular distance as will be hereinafter described.

In general terms, the bolt engagement recess 22 is formed generally transversely or radially into the bolt end portion 16 and has the surfaces thereof properly formed in a particular manner to provide an interengaging function with certain element surfaces of the lock body 12 as will also be hereinafter described. In the particular instance illustrated, the bolt engagement recess 22 is generally V-shaped in side elevation as seen, for instance, in FIG. 2, and the surface thereof nearest the bolt end surface 20 is preferably at an angle in the order of 15° to the longitudinal axis of the bolt 10. The surfaces of the bolt engagement recess 22 nearest the bolt shoulder 18 is preferably at an angle in the order of 45° to the longitudinal axis of the bolt 10.

The lock body 12 is formed with a closed bottom bolt opening 24 preferably coaxial of the longitudinal axis of the body and opening axially of a body end surface 26. The bolt opening 24 is a cylindrical opening and is of a diameter slightly larger than the diameter of the bolt end portion 16 to provide a sliding fit for such bolt end portion. At the body end surface 26, however, the bolt opening 24 is counter-sunk a short distance to a diameter slightly larger than the remaining or larger diameter portion of the bolt 10 to provide a sliding fit for the initial part of this bolt larger diameter portion and further providing an annular radial body surface 28 for abutting reception of the bolt shoulder 18 as will hereinafter appear.

The bolt opening 24 of the lock body 12 is intersected generally transversely or generally radially within the body by a closed bottom securement member opening 30 which is preferably generally cylindrical and receives a securement member therein in the form of a spring pressed plunger 32 constantly axially urged into interference with the bolt opening 24 by a usual compression spring 34. The leading end of the plunger 32 is slightly rounded and for compatibility with the particular formation of the previously described engagement recess 22 in the bolt end port 16, the securement member opening 30 determining the exact axial movement of the plunger 32 is formed at an angle in the order of 15° to the longitudinal axis of the body bolt opening 24 and ultimately the longitudinal axis of the bolt end portion 16 when inserted in the body bolt opening. Furthermore, the exact intersection of or the opening of the securement member opening 30 generally transversely or generally radially into the body bolt opening 24 is positioned so that the plunger 32 will be precisely partially received into the bolt engagement recess 22 when the bolt 10 is inserted into the body bolt opening 24 and the bolt shoulder 18 is engaged with the counter-sunk body surface 28 as will hereinafter more clearly appear.

The embodiment of seal lock illustrated is completed by a somewhat cylindrical blocking member generally indicated at 36 having a maximum outer diameter approximately equivalent to that of the bolt end portion 16 for a similar axial sliding fit within the body bolt opening 24. The blocking member 36 may also have a generally transversely or generally radially extending, circumferential retainment recess 38 formed with surfaces at similar angles to those of the bolt engagement recess 22. In other words, the surfaces of the retainment recess 38 of the blocking member 36 extend at the same 15° and 45° to the longitudinal axis of the blocking member and the body bolt opening 24 as shown.

Prior to the assembly of the bolt 10 and lock body 12 into permanently secured position, the plunger 32 and spring 34 are assembled in the body securement member opening 30 and the blocking member 36 is slid axially into the body bolt opening 24 so that the end of the plunger 32 bears axially against the blocking member within the blocking member retainment recess 38 as shown in FIG. 2. This retains the lock body 12 ready for its functional use and until it is desired to assemble the seal lock engaged with elements to be retained. At that time, the bolt 10 is inserted through the particular elements to be retained and the lock body 12 is positioned beginning to receive the bolt end portion 16 as also shown in FIG. 2.

The assembly is completed by applying opposite axial forces to the bolt head 14 and the lock 12 which causes the bolt end portion 16 to displace the blocking member 36 further axially inwardly into the body bolt opening 24, the plunger 32 axially withdrawing by compression of the spring 34 as urged by the movement of the blocking member as shown in FIG. 3. Ultimately, as the bolt end portion 16 and blocking member 36 continue to move axially, the plunger 32 engages and slides along the bolt end portion 16 finally engaging generally transversely or generally radially into the bolt engagement recess 22. At the same time that this interengagement between the plunger 32 with the bolt end portion 16 takes place, the bolt shoulder 18 comes into abutting engagement with the counter-sunk body surface 28, all as shown in FIG. 1.

It will be noted that the engagement recess 22 of the bolt end portion 16 may be formed with its same angular engagement surfaces extending completely circumferentially around the bolt end portion similar to the retainment recess 38 of the blocking member 36 wherein interengagement between the body plunger 32 into the engagement recess of the bolt end portion will take place at any relative rotated position of the bolt 10 within the body bolt opening 24. However, with the preferred form of the construction as illustrated in the drawings wherein the engagement recess 22 of the bolt end portion 16 is only at one circumferential location of the bolt end portion thereby reducing fabrication costs, it is still a very simple matter to obtain the desired permanently securing body plunger and bolt end portion surface interengagement. This is quickly accomplished merely by inserting the bolt end portion 16 fully into the body bolt opening 24 displacing the blocking member 36 as before described and until the annular bolt shoulder 18 engages the counter-sunk annular body surface 28 at which time, if the engagement recess 22 of the bolt end portion 16 is not aligned with the body plunger 32, it is merely necessary to rotate the bolt 10 until such alignment takes place and the body plunger will snap into the bolt engagement recess with a distinctive perceptive noise and feel.

Regardless, once the bolt end portion 16 has been fully axially inserted into the body bolt opening 24 and the interengagement between the surfaces of the body plunger 32 and the bolt engagement recess 22 has been obtained, the axial spanning of the body plunger still partially within the body 12 and partially within the bolt end portion 16 will permanently securely retain the bolt and body against separation without a destruction of a major part of one or the other. With the preferred angular arrangement between the longitudinal axis of the body plunger 32 and the longitudinal axis of the bolt end portion 16, any attempts to withdraw the bolt end portion from the body bolt opening 24 will tend to urge the body plunger more deeply into the bolt engagement recess 22 so as to more firmly retain the described interengagement. Also, with the annular bolt shoulder 18 axially abutting the counter-sunk annular body surface 28, not only does such abutment align the bolt engagement recess 22 for interengagement by the body plunger 32, but such abutment further presents an offset spaced inwardly of the body in the surface 26 guarding the remaining inward portion of the body bolt opening 24 against attempts to insert thin members into the body bolt opening in efforts to separate the body plunger 32 from its interengagement with the bolt engagement recess 22.

With the seal lock of the present invention, if a relatively high degree of security is required, the bolt 10 and the lock body 12 including the body plunger 32 may be formed of the high-strength alloy steels. If, however, somewhat less security can be tolerated, these parts can be formed of lesser expensive metals whether steel or other metals. In either case, the blocking member 36 may be formed of one of the well-known plastics since the use thereof is not a required high-strength use and its purpose is merely to retain the assembly of the lock body 12 until and during the initial part of the final functional single, permanently secured engagement of the bolt 10 with the lock body 12 as described.

In the preferred embodiment of the seal lock as herein illustrated and described, the body plunger 32 is angularly oriented with its longitudinal axis, although generally transversely or generally radially to the longitudinal axis of the bolt 10, at an angle of approximately 15° to the bolt longitudinal axis. This not only provides the advantage of a tendency of increased interengagement between the body plunger 32 and the bolt engagement recess 22 upon attempts to separate the bolt 10 and the lock body 12 as hereinbefore described, but also provides the advantage of permitting a substantial size of body plunger for ultimate increased security while not requiring the lock body 12 to be or larger overall size, thereby reducing the costs of fabrication.

It is pointed out, however, that the broader concepts of the present invention may be advantageously applied with a body plunger 32 in various of different angular relationships to the bolt 10. Obviously, such changes may involve changes in the contour and surfaces of the bolt engagement recess 22, as well as the degree of penetration of the body plunger 32 into the bolt engagement recess for the permanently secured engagement. The important criteria is that when the body plunger 32 and the bolt engagement recess 22 are aligned, the body plunger will penetrate the bolt engagement recess and the cooperating surfaces thereof will provide a secure interengagement between the body plunger and the bolt 10 which will permanently and securely resist subsequent separation of the lock body 12 and bolt 10. Furthermore, the seal lock concepts involved herein may be integrated into different sizes and shapes of the bolt 10 and lock body 12, as well as into multiple bolt assemblies, all of which is fully contemplated within the broad principles of the present invention.

According to the inventive principles herein disclosed, a unique, single engagement, permanently secured seal lock is therefore provided which may be fabricated with the degree of security required and only dependent on the particular materials chosen. Furthermore, the seal lock structure may be provided at a minimum of material and fabrication costs, less than the costs of prior constructions having comparable security.

I claim:

1. In a seal lock and the like of the type having an end portion of a bolt received engaged axially into a bolt opening of a body for permanent securement therein by a resiliently urged securement member mounted within said body constantly urged from an effective non-interference position into an interference position projecting partially generally transversely into said bolt opening and said bolt end portion; the improvement comprising: a separate selectively axially movable blocking member in said body bolt opening normally transversely aligned abutting said securement member retaining and constituting the sole means retaining said securement member in its effective non-interference position prior to said bolt end portion being axially inserted into said body bolt opening; axial insertion of said bolt end portion into said body bolt opening axially engaging said bolt end portion with and slidably axially inwardly displacing said blocking member from said securement member abutment and shifting generally transverse engagement of said securement member to said bolt end portion; surface means partially on said bolt end portion and partially on said securement member ultimately interengaging following the initial of said generally transverse engagement of said securement member with said bolt end portion and continued axial movement of said bolt end portion ultimately permitting automatic transverse movement of said securement member to its interference position positively preventing subsequent withdrawal of said bolt end portion from said body bolt opening.

2. In a seal lock and the like as defined in claim 1 in which said bolt opening of said body opens outwardly surrounded by a recessed, annular, generally transversely extending surface; and in which said bolt includes an annular, generally transversely outwardly extending shoulder abuttingly engaged inwardly with said body recessed annular surface when said surface means on said bolt end portion and said securement member are interengaged by movement of said securement member to its interference position.

3. In a seal lock and the like as defined in claim 1 in which said securement member is mounted within said body constantly urged movable generally transversly from its non-interference into its interference position on a longitudinal axis at an angle less than 90° to a longitudinal axis of said body bolt opening.

4. In a seal lock and the like as defined in claim 1 in which said bolt end portion has a generally transversely inwardly extending engagement recess formed therein alignable with said securement member when said bolt end portion is inserted into said body bolt opening and axially shifts said blocking member inwardly away from said securement member, surfaces within said engagement recess of said bolt end portion interengaging with surfaces on said securement member upon said generally transverse engagement of said securement member into said engagement recess of said bolt end portion by transverse movement of said securement member to its interference position positively preventing said subsequent withdrawal of said bolt end portion from said body bolt opening; in which said body bolt opening opens outwardly of said body in a surrounding, recessed annular, generally transversely extending body surface; and in which said bolt includes an annular, generally transversely outwardly extending shoulder abuttingly engaged inwardly with said body recessed annular surface when said engagement recess surfaces of said bolt end portion and said securement member surfaces are interengaged by movement of said securement member to its interference position.

* * * * *